United States Patent [19]

Sugio et al.

[11] 4,087,411
[45] May 2, 1978

[54] PROCESS FOR PREPARING OXYMETHYLENE POLYMERS

[75] Inventors: Akitoshi Sugio, Ohmiya; Yoshiharu Ohtsuki, Urawa; Toshikazu Umemura; Makoto Mizutani, both of Tokyo, all of Japan

[73] Assignee: Mitsubishi Gas Chemical Company, Inc., Japan

[21] Appl. No.: 722,671

[22] Filed: Sep. 13, 1976

[30] Foreign Application Priority Data

Sep. 17, 1975 Japan .............................. 50-112297
Sep. 17, 1975 Japan .............................. 50-112298
Nov. 5, 1975 Japan .............................. 50-132546

[51] Int. Cl.² .......................... C08G 2/28; C08G 2/10
[52] U.S. Cl. ............................ 260/67 FP; 260/45.7 P
[58] Field of Search ...................... 260/67 FP, 45.7 P

[56] References Cited

U.S. PATENT DOCUMENTS

| | | | |
|---|---|---|---|
| 2,989,509 | 6/1961 | Hudgin et al. | 260/67 FP |
| 3,219,623 | 11/1965 | Berardinelli | 260/67 FP X |
| 3,225,005 | 12/1965 | Asmus et al. | 260/67 FP |
| 3,278,635 | 10/1966 | Bastian | 260/67 FP X |
| 3,378,528 | 4/1968 | Fernholz et al. | 260/67 FP |
| 3,432,471 | 3/1969 | Wolf | 260/67 FP |
| 3,454,683 | 7/1969 | Kampe et al. | 260/67 FP X |
| 3,459,709 | 8/1969 | Ackermann et al. | 260/67 FP |
| 3,666,714 | 5/1972 | Hafner et al. | 260/67 FP X |

Primary Examiner—Lucille M. Phynes
Attorney, Agent, or Firm—Wenderoth, Lind & Ponack

[57] ABSTRACT

A process for preparing oxymethylene polymers which comprises polymerizing trioxane or both trioxane and a specific cyclic ether in the presence of a catalytic amount of a boron fluoride-type catalyst, stopping the polymerization, and then subjecting the resulting polymer to a terminal stabilizing treatment, wherein the polymerization is stopped by adding a specific trivalent organic phosphorus compound and then the terminal stabilizing treatment is performed without removing the catalyst from the polymer.

8 Claims, No Drawings

PROCESS FOR PREPARING OXYMETHYLENE POLYMERS

This invention relates to a process for preparing oxymethylene polymers of copolymers. More specifically, the invention relates to a process for preparing oxymethylene polymers or copolymers, which comprises polymerizing trioxane or both trioxane and another cyclic ether in the presence of a boron fluoride-type catalyst, stopping the polymerization, and treating the polymer to stabilize its terminals, characterized in that the polymerization is stopped by adding a specific trivalent organic phosphorus compound, and the terminal stabilizing treatment is carried out without removing the catalyst.

It is known, for example, from Japanese Pat. Publication No. 3542/60 that a polyacetal homopolymer or copolymer is prepared by cationic polymerization of trioxane or both trioxane and another cyclic ether. The resulting homo- or copolymer must be subjected to a terminal stabilizing treatment because it has poor thermal stability. Prior to this treatment, the reaction must be stopped by neutralizing and deactivating the catalyst. Unless the remaining catalyst is deactivated, the resulting polyacetal homo- or copolymer is gradually depolymerized to undergo a drastic reduction in molecular weight.

U.S. Pat. No. 2,989,509 discloses the neutralization and deaactivation of the polymerization catalyst, and the washing of the polymerization product. According to this patent, the free catalyst is neutralized with a stoichiometrically larger amount of an aliphatic amine or heterocyclic amine than the catalyst, and then removed from the polymer by filtration and washing.

Japanese Pat. Publications Nos. 8071/64 and 1875/68 and Japanese Laid-Open Pat. Publication No. 23294/74 discloses methods for stabilizing the terminal groups of oxymethylene copolymers. In these methods, too, the catalyst within the polymer is neutralized with an amine and thus deactivated prior to the stabilization of the terminal groups, and then removed from the polymer by filtration and washing.

Stabilized oxymethylene copolymers without reduced molecular weights can be obtained if as in the above prior methods, the catalyst is deactivated by neutralization with an amine, and removed by washing with an organic solvent or water followed by filtration. When the catalyst is neutralized with amines but not removed from the polymer, the polymer is depolymerized when melted or dissolved. Accordingly, in the prior techniques, it is essential both to deactivate the free catalyst in the polymer by neutralization with an amine and to remove the catalyst from the polymer by a sufficient washing operation.

Removal of the catalyst must be performed by pulverizing the polymer as finely as possible, and washing it repeatedly. Desirably, the polymer needs to be washed in a mixture of water and an alcohol at a temperature of from 100° C to a point near the melting point of the polymer. Such a step is extremely disadvantageous for commercial operations since it involves the recovery and purification of the solvent used, and the filtration and drying of the washed polymer.

The inventors of the present application made extensive investigations in an attempt to overcome the disadvantages of the conventional methods, and to produce oxymethylene polymers having superior thermal stability. These investigations led to the discovery that when the free catalyst remaining in the polymer is neutralized with a specific trivalent organic phosphorus compound in a stoichiometrical amount equal to or larger than that of the catalyst, not only the catalyst is deactivated, but also the thermal stability of the polymer is not impaired even when the catalyst remains in the polymer after neutralization.

According to the present invention, there is provided a process for preparing oxymethylene polymers which comprises polymerizing trioxane or both trioxane and a cyclic ether of the following general formula

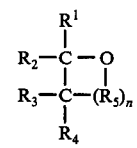

wherein $R_1$, $R_2$, $R_3$ and $R_4$, identical or different, represent a hydrogen atom, an alkyl group containing 1 to 5 carbon atoms, or an alkyl group containing 1 to 5 carbon atoms and substituted by 1 to 3 halogen atoms and $R_5$ represents a methylene group, a methylene group substituted by an alkyl group, a methylene group substituted by a haloalkyl group, an oxymethylene group, an oxymethylene group substituted by an alkyl group or an oxymethylene group substituted by a haloalkyl group, in which case $n$ is 0 or an integer of 1 to 3, the substituent alkyl group is an alkyl group containing 1 to 5 carbon atoms and the substituent haloalkyl group is an alkyl group containing 1 to 5 carbon atoms and substituted by 1 to 3 halogen atoms, or $R_5$ represents $-(CH_2)_m-OCH_2-$, or $-(OCH_2-CH_2)_m-OCH_2-$ in which $m$ is an integer of 1 to 3, in which case $n$ is 1, in the presence of a catalytic amount of a boron fluoride-type catalyst, stopping the polymerization, and then subjecting the resulting polymer to a terminal stabilizing treatment, wherein the polymerization is stopped by adding a trivalent organic phosphorus compound of the following general formula

wherein each of $R_1$, $R_2$ and $R_3$ represents an alkyl, haloalkyl, aryl, substituted aryl, alkoxy, substituted alkoxy, aryloxy, substituted aryloxy, alkylthio, substituted alkylthio, arylthio or substituted arylthio group, and then the terminal stabilizing treatment is performed without removing the catalyst from the polymer.

The polymers produced by the process of this invention include both homopolymers and copolymers of oxymethylene, but in the present specification and claims, these are inclusively referred to as oxymethylene polymers.

The oxymethylene homopolymers are those consisting substantially of oxymethylene units, and the oxymethylene copolymers are those containing 0.4 to 40 moles%, preferably 0.4 to 10 mole%, based on the total weight of the copolymer, of an oxyalkylene unit on the oxymethylene main chain.

The cyclic ether which is a comonomer that will give the oxyalkylene unit is a compound expressed by the following general formula

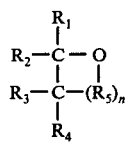

wherein $R_1$, $R_2$, $R_3$ and $R_4$, identical or different, represent a hydrogen atom, an alkyl group containing 1 to 5 carbon atoms, or an alkyl group containing 1 to 5 carbon atoms and substituted by 1 to 3 carbon atoms; and $R_5$ represents a methylene group, a methylene group substituted by an alkyl group, a methylene group substituted by a haloalkyl group, an oxymethylene group, an oxymethylene group substituted by an alkyl group, or an oxymethylene group substituted by a haloalkyl group, in which case $n$ is 0 or an integer of 1 to 3, the substituent alkyl group is an alkyl group containing 1 to 5 carbon atoms, and the substituent haloalkyl group is an alkyl group containing 1 to 5 carbon atoms and substituted by 1 to 3 carbon atoms, or $R_5$ alternatively represents $-(CH_2)_m-OCH_2$, or $-(OCH_2-CH_2)_m-OCH_2-$ in which $m$ is an integer of 1 to 3, in which case $n$ is 1. A chloride atom is especially preferred as the halogen atom.

The cyclic ethers of the above formula copolymerizable with trioxane are known per se. Ethylene oxide, glycol formal and diglycol formal are especially suitable for use in the present invention. Propylene oxide and epichlorohydrin can also be used as the cyclic ether. Other usable cyclic ethers include, for example, cyclic formals of long-chain α,ω-diols, such as butanediol formal or hexanediol formal.

The polymerization catalyst used in the process of this invention is at least one compound selected from boron trifluoride, boron trifluoride hydrate and coordinated complex compounds of boron trifluoride with organic compounds in which oxygen or sulfur is the donor atom. For example, the coordinated complex compound may be a complex of boron trifluoride with an alcohol, a phenol, an acid, an ether, an acid anhydride, an ester, a ketone, an aldehyde or a dialkyl sulfide. Boron fluoride etherate, which is a coordinated complex compound formed between diethyl ether and boron trifluoride is an especially preferred catalyst. The above polymerization catalysts are known per se, and in the present invention, the polymerization catalyst is used in the form of a gas, a liquid or a solution in a suitable organic solvent.

The amount of the catalyst used is usually 30 to 1,000 ppm, preferably 100 to 200 ppm, calculated as the weight of boron fluoride based on the weight of the monomer or monomers used.

The polymerization reaction can be performed in bulk in the absence of a solvent at a temperature above the melting point of trioxane, or in the solid phase at a temperature below its melting point, or in the presence of a solvent inert to the reaction such as benzene or cyclohexane.

The trivalent organic phosphorus compound used as a deactivator in the process of this invention is expressed by the following general formula

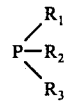

wherein each of $R_1$, $R_2$ and $R_3$ represents an alkyl, haloalkyl, aryl, substituted aryl, alkoxy, substituted alkoxy, aryloxy, substituted aryloxy, alkylthio, substituted alkylthio, arylthio or substituted arylthio group.

Examples of the trivalent organic phosphorus compounds include phosphines such as ethyltetramethylene phosphine, n-butyldimethyl phosphine, triethyl phosphine, ethylpentamethylene phosphine, dimethylphenyl phosphine, methylethyl-n-pentyl phosphine, diethylbutyl phosphine, tri-n-butyl phosphine, methyldiphenyl phosphine, ethyl-n-pentylphenyl phosphine, methylbenzylphenyl phosphine, ethyldiphenyl phosphine, ethyl-n-hexylphenyl phosphine, benzyl-n-butyl-n-propyl phosphine, ethyldicyclohexyl phosphine, isopropyl diphenyl phosphine, ethylbenzylphenyl phosphine, dibenzylethyl phosphine, n-butyldiphenyl phosphine, n-propylbenzylphenyl phosphine, n-butylbenzylphenyl phosphine, triphenyl phosphine, cyclohexyldiphenyl phosphine, dibenzyl-n-butyl phosphine, dicyclohexylphenyl phosphine, tricyclohexyl phosphine, diphenylbenzyl phosphine, dibenzylphenyl phosphine and tribenzyl phosphine; phosphinites such as ethyl dipropylphosphinite, ethyl butylethylphosphinite, ethyl methylphenylphosphinite, ethyl ethylphenylphosphinite, ethyl dibutylphosphinite, methyl diphenylphosphinite, ethyl diphenylphosphinite, phenyl diphenylphosphinite, and phenyl dibenzylphosphinite; phosphonites such as dimethyl ethylphosphonite, diethyl ethylphosphonite, diphenyl ethylphosphonite, diethyl propylphosphonite, diethyl butylphosphonite, diethyl phenylphosphonite, dimethyl phenylphosphonite and diethyl benzylphosphonite; triesters of phosphorous acid such as trimethyl phosphite, triethyl phosphite, tri-n-propyl phosphite, tri-iso-propyl phosphite, tri-n-butyl phosphite, triphenyl phosphite, tricyclohexyl phosphite, tribenzyl phosphite, tritolyl phosphite, tri-β-naphthyl phosphite, tridecyl phosphite and trinonylphenyl phosphite; and triesters of trithiophosphorous acid such as tristearyl trithiophosphite and trilauryl trithiophosphite.

Generally, the phosphines are most preferred for use in this invention, and next come the phosphinites, phosphonites, phosphites and trithiophosphites in order of decreasing preference. Especially suitable trivalent organic phosphorus compounds are as follows:

Triphenyl phosphine and tri-n-butyl phosphine, especially the former, are most preferred phosphines. Alkyl diphenylphosphinites are preferred as the phosphinites, and ethyl diphenylphosphinite is most preferred. Preferred phosphonites are diphenyl alkylphosphonites among which diphenyl ethylphosphonite is especially preferred. Preferred triesters of phosphorous acid are tridecyl phosphite, triphenyl phosphite, tritolyl phosphite and tri-p-nonylphenyl phosphite, the triphenyl phosphite being most preferred. Tristearyl trithiophosphite and trilauryl trithiophosphite are preferred as the triesters of trithiophosphorous acid.

The amount of the deactivator is not particularly limited so long as the catalyst can be deactivated and the polymerization stopped. Usually, it is at least equimolar to the catalyst, preferably 1.5 to 30 molar times, especially preferably 2 to 10 molar times, the amount of the catalyst.

The deactivator may be added in various ways. For example, the reaction product is suspended in a solution containing the deactivator at the time of completion of the reaction, and then the solvent is removed. Or the deactivator may be mixed and dispersed in the reaction product mechanically. Alternatively, the deactivator may be added to the reaction mixture during the reaction.

Addition of the trivalent organic phosphorus compound to the reaction system during the reaction can lead to the deactivation of the catalyst and the stopping of the polymerization. Or by adding the trivalent organic phosphorous compound after the end of the polymerization reaction, the catalyst is deactivated, and the depolymerization of the resulting polymer can be prevented.

In the process of this invention, small amounts of trioxane, the catalyst and the deactivator remaining in the product need not to be removed by washing with solvents. This is the superior advantage of the invention over the conventional methods, which is due to the use of the specific trivalent organic phosphorus compound as a deactivator. When the organic phosphorus compound of formula (2) is used as a deactivator in accordance with the present invention, the phosphorus compound not only deactivates the catalyst, but also offers the advantage that it does not adversely affect the thermal stability of the polymer even when the catalyst remains in the polymer. This procedure is far superior to the conventional methods which require the use of aliphatic amines or heterocyclic amines. Accordingly, when the polymerization is stopped in accordance with the present invention, the subsequent washing step can be omitted, and the overall process of polymer preparation can be simplified.

When it is desired to prepare an oxymethylene homopolymer by the process of this invention, trioxane alone is polymerized, and the polymerization is stopped by the method described hereinabove. Then, the polymer is subjected to a known terminal stabilizing treatment, for example, by an acetylation treatment. According to this invention, a stable oxymethylene homopolymer can be obtained without removing the catalyst by a washing operation after the stopping of the polymerization, and therefore, the polymer producing process can be simplified.

When it is desired to produce an oxymethylene copolymer by the process of this invention, trioxane and the cyclic ether of formula (1) are copolymerized, and the polymerization is stopped by the method described hereinabove. Then, the copolymer is subjected to a known terminal stabilizing treatment for example, a heat stabilizing treatment in the presence of stabilizers. Since a stable oxymethylene copolymer can likewise be obtained without removing the catalyst by washing after the stopping of the copolymerization reaction, the production process can be simplified. This advantage is more important in the case of producing copolymers in which the terminal groups of the copolymer can be stabilized by mere heating, than in the case of producing homopolymers which usually requires a special treatment such as acetylation. The production of oxymethylene copolymers by the process of this invention offers the advantage that according to a batchwise process, all steps can be carried out in one tank; and that in continuous processes, the stopping of copolymerization, the terminal stabilizing treatment and the granulation of the copolymer can be carried out substantially in a single step by merely changing temperature ranges without any need to perform them separately from the copolymerization step. The present invention provides a very advantageous process for producing oxymethylene copolymers, and its economic merit is very great.

One especially preferred method of producing oxymethylene copolymers comprises polymerizing trioxane and the cyclic ether of formula (1) in the presence of a boron trifluoride-type catalyst, adding the trivalent organic phosphorus compound of formula (2) and a small amount of a stabilizer, and heating the mixture at a temperature ranging from a point 50° C below the melting point of the oxymethylene copolymer to a point 50° C above it thereby to form a stable oxymethylene copolymer containing oxymethylene units and oxyalkylene units.

This procedure is described below in more detail. After the polymerization, the trivalent organic phosphorus compound are added to the copolymer, and the mixture is heated without prior filtration or washing, thereby to decompose the unstable terminal oxymethylene units of the copolymer molecules. The heating temperature ranges from a point 50° C below the melting point of the oxymethylene copolymer to a point 50° C above it. In actual operations, the trivalent organic phosphorus compound and stabilizer are added batchwise or continuously to the copolymer which is being fed batchwise or continuously. If required, water, methanol, ammonia or mixtures of these are also added, and they are mixed at elevated temperatures to decompose the unstable terminal oxymethylene units of the copolymer and thereby to produce a stable oxymethylene copolymer.

According to the process of this invention, the batchwise or continuous production of oxymethylene polymers can be performed by very simple process steps. In the btachwise production, the polymerization vessel equipped with stirring vanes is charged with trioxane and a comonomer together, if desired, with a suitable solvent, and they are polymerized in the presence of a catalyst. After the polymerization, the trivalent organic phosphorus compound and the heat stabilizer and/or oxidation stabilizer (antioxidant) are added, and the mixture is directly heated to decompose the unstable terminal portions of the copolymer. Formaldehyde resulting from the decomposition, the unreacted trioxane and the solvent are recovered to afford an oxymethylene copolymer having superior thermal stability.

As previously stated, an especially preferred embodiment of the process of this invention is to apply the process to the continuous production of oxymethylene copolymers. This process enables the production, stabilization and granulation of copolymers to be performed in substantially a single step. According to this embodiment, trioxane and the cyclic ether are fed together with the boron trifluoride-type catalyst into one end of a suitable polymerization apparatus such as a co-kneader or biaxial extruder, and the monomers are copolymerized under heat. During the polymerization, the trivalent organic phosphorus compound and the stabilizer are supplied to the polymerization system through a feed hole provided in the polymerization apparatus. The mixture is heated to decompose the unstable terminal portions of the copolymer. While formaldehyde generated by the decomposition and the unreacted trioxane are being removed from a vent, a stabilized oxymethylene copolymer is extruded from a die at the tip of the apparatus, and cut to pellets. It is of course possible to connect a polymerization apparatus and a heat stabilizing apparatus to each other in series, and perform polymerization and stabilization successively thereby to produce an oxymethylene copolymer stabilized to heat.

In the terminal stabilizing treatment of an oxymethylene copolymer by heating, the copolymer is heated in the presence of a stabilizer such as an oxidation stabilizer or a heat stabilizer in order to prevent the deterioration of the copolymer by oxidation and heat, etc. The use of both an oxidation stabilizer and a heat stabilizer is especially preferred. Oxidation stabilizers and heat stabilizers used for this purpose are known per se. There is no particular restriction on oxidation stabilizers that can be used in the present invention, but hindered phenol-type oxidation stabilizers are desirable. They include, for example, 2,6-ditert-butyl-4-methyl phenol, or commercially available hindered phenol-type stabilizers shown below.

Antioxidant 2246
(Ethyl Corp.)

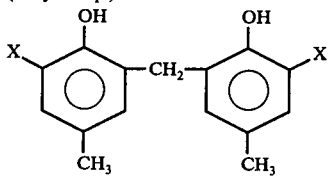

2,2'-methylene-bis-(4-methyl-6-tert.-butylphenol)

Antioxidant 425
(Ethyl Corp.)

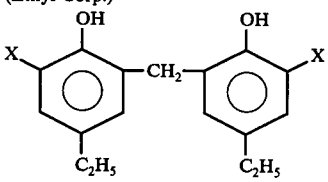

2,2'-methylene-bis-(4-ethyl-6-tert.butylphenol)

Irganox 1035
(Ciba-Geigy)

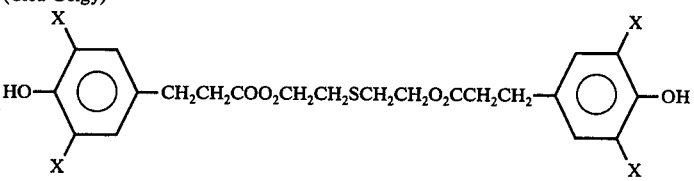

2,2'-thiodiethanol bis(3,5-di-tert.butyl-4-hydroxyhydrocinnamate)

Irganox 1010
(Ciba-Geigy)

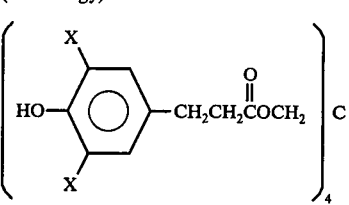

tetrabis-[methylene-(3,5-ditert.butyl-4-hydroxyhydrocinnamate)]methane

Irganox 1076
(Ciba Geigy)

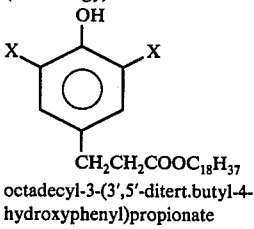

octadecyl-3-(3',5'-ditert.butyl-4-hydroxyphenyl)propionate

Irganox 259
(Ciba-Geigy)

-continued

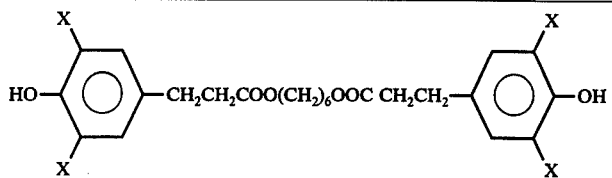

hexamethylene glycol bis(3,5-di-tert.-butyl-4-hydroxyhydrocinnamate)

Irganox 1093
(Ciba-Geigy)

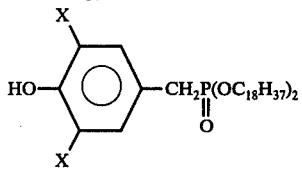

distearyl 3,5-di-tert.butyl-4-hydroxybenzylphosphonate
Irganox 1890
(Ciba-Geigy)

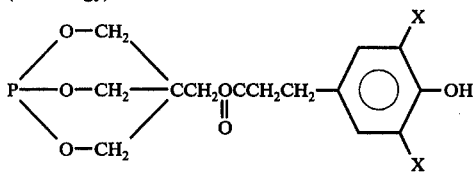

2,6,7-trioxa-1-phosphobicyclo[2,2,2]oct-4-ylmethyl 3,5-di-tert.butyl-4-hydroxyhydrocinnamate Irganox 565
(Ciba-Geigy)

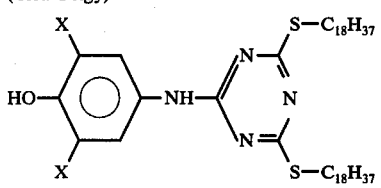

3,5-di-tert.butyl-4-hydroxyphenyl 3,5-distearylthio triazyl amine

Tinuvin 327
(Ciba-Geigy)

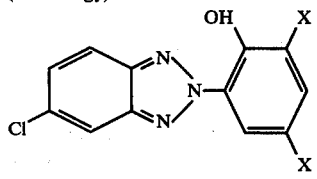

2(2'-hydroxy-3',5'-ditert.butylphenyl)-5-chlorobenzotriazole

Ionox 100
(Shell Chemical)

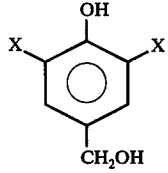

2,6-di-tert.butyl-4-hydroxymethylphenol

Ionox 330
(Shell Chemical)

-continued

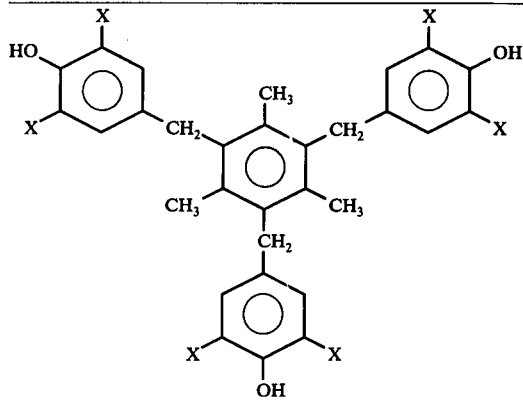
1,3,5-trimethyl-2,4,6-tris(3,5-di-tert.butyl-4-hydroxybenzyl)benzene

Ionox 220
(Shell Chemical)

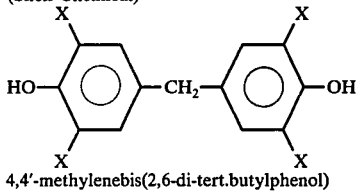
4,4'-methylenebis(2,6-di-tert.butylphenol)

Antioxidant 703
(Ethyl Corp.)

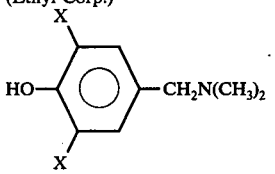
3,5-di-tert.butyl-4-hydroxybenzyl dimethyl amine

Irganox 1098

N,N'-hexamethylene bis(3,5-di.tert.butyl-4-hydroxyhydrocinnamide

[X in the above formulae represents tertiary butyl.]

Of these, 2,6-di-tert.-butyl-4-methyl phenol, 2,2'-methylene-bis(4-methyl-6-tert.butyl phenol), Irganox 259, Irganox 1010, and Irganox 1098 are preferred.

No restriction is imposed either on heat stabilizers that can be used in the present invention. Examples of the heat stabilizers include carboxylic acid polyamides, polyurethane, urethane compounds, urea compounds, polyvinyl pyrrolidone, hydrazine, hydrazide, hydrazide derivatives, tertiary amines, compounds containing a tertiary amide group, amidine compounds, alicyclic amines, and aliphatic acyl ureas. Preferred heat stabilizers are non-basic nitrogen compounds, for example, polyamides, polyurethane, urethane compounds such as alkylene diurethanes, and urea compounds. Basic heat stabilizers such as polyvinyl pyrrolidone, hydrazide derivatives and amidine compounds can of course be used.

The amount of the stabilizer, which varies according to its type, is usually 0.1 to 5% by weight, preferably 0.2 to 2% by weight, based on the oxymethylene copolymer.

When the polymer is directly heat stabilized in such a non-basic stabilizer without washing it beforehand in accordance with the process of this invention, the coloration or molecular weight reduction of the polymer may result upon heating for long periods of time. The present inventors have found in this regard that if a basic compound such as the hydroxides, inorganic weak acid salts, organic acid salts or alkoxides of alkali metal and/or alkaline earth metals is used together with the above stabilizer as a stabilization aid, an oxymethylene copolymer having superior thermal stability can be formed without a reduction in molecular weight.

Generally, the use of at least one base selected from the hydroxides, inorganic weak acid salts, organic carboxylic acid salts and alkoxides of alkali metals or alkaline earth metals as a stabilization aid gives rise to a marked effect of preventing the molecular weight reduction and coloration of oxymethylene copolymers.

Addition of other basic compounds such as amines, hydrazine, hydrazide and ammonia is undesirable because it causes coloration of the polymer.

In the above-mentioned stabilization aids, preferred alkali metals and alkaline earth metals are lithium, potassium, sodium, calcium, magnesium, strontium, and barium, the potassium, sodium and calcium being especially preferred. Examples of the inorganic weak acid salts are carbonates, phosphates, silicates, and borates. Examples of the organic acid salts are formates, acetates, oxalates, salts of oxydiacetic acid (HOOCCH$_2$CH$_2$OCH$_2$CH$_2$COOH), and phenolates. Examples of the alkoxides are those derived from methanol and ethanol. These stabilization aids may be used alone or in admixture of two or more. The amount of the stabilization aid, which differs according to its type, generally ranges preferably from 0.001 to 10% by weight, especially preferably from 0.01 to 1% by weight. The stabilization aid is added in the form of either a powder or a solution.

EXAMPLE 1

Trioxane and cyclohexane in equal amounts were fed into a polymerization vessel, and stirred at 60° C. Boron trifluoride diethyl etherate was added in an amount of 0.033 mole% based on the trioxane, and the monomeric mixture was polymerized. In one to two minutes after the initiation of polymerization, the reaction mixture turned whitish, and on continuing the polymerization for about 1 hour, a white uniform product was obtained. The polymer was suspended in methanol containing triphenyl phosphine in an amount 3 molar times the amount of the catalyst thereby to deactivate the catalyst. The polymer was filtered, dried, and then treated with acetic anhydride using sodium acetate as a catalyst thereby to acetylate its terminal groups. The polymer treated was washed with water and then with methanol, and dried to afford a polymer having an intrinsic viscosity, measured at 60° C in p-chlorophenol containing 2% α-pinene, of 1.40 dl/g. Nylon-6 and 2,2'-methylenebis(4-methyl-6-tert.butyl phenol) were added, and the mixture was compression molded into a tough film.

For comparison, the above procedure was repeated escept that the triphenyl phosphine was not added. The terminal-acetylated polymer showed a molecular weight reduction during the acetylation treatment, and the polymer finally obtained had an intrinsic viscosity of 1.10 dl/g. Nylon-6 and 2,2'-methylenebis(4-methyl-6-tert.butyl phenol) were added to the polymer, and the mixture was compression molded into a film which was found to be poor in toughness and heat stability.

EXAMPLE 2

Trioxane and 2.5% by weight, based on the trioxane, of ethylene oxide were fed into a portable kneader which has two sigma-blades, and dissolved at 60° C. Boron trifluoride diethyl etherate was added in an amount of 0.013 mole% based on the trioxane, and the monomers were polymerized with stirring for about 1 hour. Triphenyl phosphite in an amount 5 molar times the amount of the catalyst, and cyanoguanidine and 2,2'-methylenebis(4-methyl-6-tert.butyl phenol) were added to the resulting copolymer each in an amount of 0.5% by weight, based on the copolymer, and they were mixed by a Henschel mixer and then kneaded in a heated chamber having a pair of parallel counter-rotating screws (called a laboplast mill) to decompose the unstable terminal portions of the polymer. The resulting copolymer had an intrinsic viscosity of 1.45 dl/g and a K$_{222}$ value (the weight loss in air at 222° C; %/min.) of 0.015.

A molded article obtained by injection molding of this copolymer had the following properties.
Tensile strength — 600 Kg/cm$^2$
Tensile elongation — 60%
Flexural strength — 810 kg/cm$^2$
Flexural modulus — 22600 kg/cm$^2$
Izod impact strength (notched; ⅛ inch) — 6.5 kg-cm/cm
Tensile impact strength — 150 kg-cm/cm$^2$
Heat distortion temperature — 110° C Triphenyl phosphine and tributylamine as deactivator were compared in the following manner.

A copolymer of trioxane and ethylene oxide was prepared in the same way as described above. Triphenyl phosphine was added to the resulting copolymer in an amount 5 molar times the amount of the catalyst in the copolymer and dispersed in it. Then, the mixture was allowed to stand at room temperature, and the intrinsic viscosity of the polymer was measured after it was left to stand for 2 days and 10 days.

For comparison, the same viscosity measurement was performed on the copolymer which was left to stand without adding any compound to it, and the copolymer which was suspended in methanol containing tributylamine in an amount 3 molar times the amount of the catalyst in the copolymer, washed, dried, and then allowed to stand. The results are shown in Table 1.

Table 1

|  | Deactivator | Washing with solvent | Intrinsic viscosity [η] (dl/g) After 2 days | After 10 days |
|---|---|---|---|---|
| Invention | Triphenyl phosphine | No | 1.79 | 1.76 |
| Comparison | None | No | 1.55 | 1.29 |
|  | Tributylamine | Yes | 1.74 | 1.61 |

EXAMPLE 3

The same kneader as used in Example 2 was charged with trioxane, 10% by weight, based on the trioxane, of cyclohexane and 4.0% by weight, on the same basis, of 1,3-dioxepane, and they were dissolved at 60° C. Boron trifluoride diethyl etherate was added in an amount of 0.020 mole% based on the trioxane, and the mixture was stirred for 1 hour to perform the polymerization. To the resulting copolymer were added triphenyl phosphine in an amount equimolar to the amount of the catalyst and cyanoguanidine and 2,2'-methylenebis(4-methyl-6-tert.butyl phenol) each in an amount of 0.5% by weight based on the polymer, and they were mixed by a Henschel mixer and kneaded under heat by a laboplast mill to remove the unstable terminal portions.

The resulting copolymer had an intrinsic viscosity of 1.52 dl/g and a K$_{222}$ value of 0.010 %/min. A molded article obtained by injection molding of the copolymer had the following properties.
Tensile strength — 609 kg/cm$^2$
Tensile elongation — 50%
Flexural strength — 820 kg/cm$^2$
Flexural modulus — 24000 kg/cm$^2$
Izod impact strength (notched; ⅛ inch) — 7.0 kg-cm/cm
Tensile impact strength — 150 kg-cm/cm$^2$
Heat distortion temperature — 108° C

EXAMPLE 4

A kneader equipped with two sigma-blades was charged with trioxane, and it was heated at 60° C. Ethylene oxide was added in an amount of 2.5% by weight based on the trioxane, and 0.013 mole%, on the same basis of boron trifluoride diethyl etherate was added. The monomers were polymerized with stirring for 15 minutes to afford an oxymethylene copolymer in a yield of 98%. A part of the resulting polymer, without washing, was mixed with triphenyl phosphine in an amount 5 molar times the amount of the catalyst, and also with nylon-6 and 2,2'-methylenebis(4-methyl-6-tert.butyl phenol) in a laboplast mill at 190° C for 20 minutes. The resulting stabilized copolymer had an intrinsic viscosity of 1.50 dl/g and a $K_{222}$ value of 0.095 %/min.

For comparison, the remainder of the copolymer just after the reaction was suspended in methanol containing triethylamine to neutralize the catalyst, washed, and dried. To the copolymer so treated were added nylon-6 and 2,2'-methylenebis(4-methyl-6-t-butylphenol) each in an amount of 0.5% by weight, and the mixture was kneaded in a laboplast mill at 190° C for 20 minutes to decompose the unstable terminal portions of the copolymer and thereby to afford a stable oxymethylene copolymer which had a an intrinsic viscosity of 1.40 dl/g and a $K_{222}$ value of 0.097 %/min.

When the catalyst was deactivated with the amine but the polymer was not washed, the thermal stability of the final oxymethylene copolymer was very poor.

EXAMPLE 5

Trioxane and 3.5% by weight of 1,3-dioxepane were copolymerized in the same way as in Example 4 to afford an oxymethylene copolymer in a yield of 97.5%. The copolymer was divided into two portions. One portion was not washed, and triphenyl phosphine was added in an amount 5 molar times the amount of the catalyst. Simultaneously, nylon-6 and 2,2'-methylenebis(4-methyl-6-tert.butyl phenol) were added each in an amount of 0.5% by weight based on the polymer. The mixture was kneaded in a laboplast mill under heat to decompose the unstable terminal portions of the polymer. The resulting copolymer had an intrinsic viscosity of 1.93 dl/g and a $K_{222}$ value of 0.050 %/min.

For comparison, the other portion of the copolymer divided was washed with methanol containing an excess of triethylamine, and dried. Nylon-6 and 2,2'-methylenebis(4-methyl-6-tert.butyl phenol) were added each in an amount of 0.5% by weight, and they were kneaded under heat in a laboplast mill to decompose the unstable terminal portions. The stabilized copolymer had an intrinsic viscosity of 1.95 dl/g and a $K_{222}$ value of 0.043 %/min.

EXAMPLE 6

A kneader of the same type as used in Example 4 was charged with trioxane, 10% by weight, based on the trioxane, of cyclohexane and 2.5% by weight, on the same basis, of ethylene oxide, and they were dissolved at 60° C. Then, 0.017 mole%, based on the trioxane, of boron trifluoride diethyl etherate was added, and the monomeric mixture was polymerized to afford an oxymethylene copolymer in a yield of 97%.

The copolymer was divided into two portions. One portion was not washed, and triphenyl phosphine was added in an amount 5 molar times the amount of the catalyst used. Then, nylon-6 and 2,2'-methylenebis(4-methyl-6-tert.butyl phenol) were added each in an amount of 0.5% by weight based on the polymer, and they were kneaded under heat in a laboplast mill to afford a copolymer (designated as copolymer [A]).

For comparison, the other portion of the copolymer divided was not washed, and tributylamine was added in an amount 5 molar times the amount of the catalyst present in the polymer. They were kneaded under heat together with nylon-6 and 2,2'-methylenebis(4-methyl-6-tert.butyl phenol) to afford a copolymer (designated as copolymer [B]).

The intrinsic viscosities and $K_{222}$ value of these copolymers were as follows:

| Copolymer | [η] dl/g | $K_{222}$ %/min. |
|---|---|---|
| [A] | 1.64 | 0.081 |
| [B] | 1.31 | 0.095 |

EXAMPLE 7

A copolymer of trioxane and ethylene oxide was prepared in the same way as in Example 6. To the copolymer were added 5 molar times the amount of the catalyst in the copolymer of each of the organic phosphorus compounds shown in the following table and 0.5% by weight, based on the weight of the polymer, of each of the stabilizers shown in the following table, and they were kneaded under heat. The intrinsic viscosities and $K_{222}$ values of the stabilized copolymers were as shown Table 2.

For comprison, methanol containing tributylamine was added to the copolymer after the reaction, and with thorough stirring, the copolymer was washed. It was filtered, and dried. Then, the same stabilizers as mentioned above were added, the materials were kneaded under heat by a laboplast mill. The results obtained are also tabulated below.

Table 2

| | Deactivator | Washing with solvent and filtration | Stabilizer | [η] (dl/g) | $K_{222}$ (%/min.) |
|---|---|---|---|---|---|
| Comparison | Tributyl-amine | Yes | Cyanoguanine and 2,2'-methylenebis (4-methyl-6-tert.butyl phenol) | 2.06 | 0.012 |
| Invention | Triphenyl phosphine | No | " | 2.10 | 0.020 |
| | Triphenyl phosphite | No | " | 1.99 | 0.010 |
| | Tridecyl phosphite | No | " | 1.98 | 0.025 |

EXAMPLE 8

Trioxane, 10% by weight, based on the trioxane, of cyclohexane and 2.5% by weight, on the same basis, of ethylene oxide were dissolved at 60° C, and continuously fed into a biaxial extruder (Werner ZDS-RE type, a product of Werner & Pfleiderer, Germany) at a rate of 20 kg/hr. A benzene solution of boron trifluoride diethyl etherate was continuously fed from the feed section of the extruder in an amount of 0.015 mole% calculated as boron trifluoride etherate based on the trioxane charged. The residence time within the extruder was about 15 minutes. A white copolymer powder was obtained from the tip of the extruder continuously. To the product were added triphenyl phosphine in an amount 5 molar times the amount of the catalyst in the product and cyanoguanidine and 2,2'-methylenebis(4-methyl-6-tert.butyl phenol) each in an amount of 0.5% by weight based on the polymer while mixing with stirring. The mixture was continuously fed to a second extruder of the same type. The temperature was maintained at 200° C, and formaldehyde generated, the unreacted trioxane and the solvent were recovered from a vent outlet. The copolymer strand continuously extruded from the die was pelletized by a pelletizer. The resulting stabilized oxymethylene copolymer had an intrinsic viscosity of 1.67 dl/g and a $K_{222}$ value of 0.015 %/min. A molded article obtained by injection molding had the following characteristics.

Tensile strength — 600 kg/cm$^2$
Tensile elongation — 60%
Flexural strength — 800 kg/cm$^2$
Flexural modulus — 22600 kg/cm$^2$
Izod impact strength (notched; ⅛ inch) — 6.5 kg-cm/cm
Tensile impact strength — 140 kg-cm/cm$^2$
Heat distortion temperature — 110° C

EXAMPLE 9

5 kg of trioxane, 0.5 kg of cyclohexane and 0.2 kg of 1,3-dioxepane were placed in a Henschel-type high speed stirring reactor, and dissolved at 60° C. Then, a benzene solution of 0.020 mole%, based on the trioxane, of boron trifluoride diethyl etherate was added, and the monomeric mixture was polymerized for 30 minutes. To the resulting copolymer were added triphenyl phosphine in an amount 5 molar times the amount of the catalyst present in the copolymer and cyanoguanidine and 2,2'-methylenebis(4-methyl-6-tert.butyl phenol) each in an amount of 0.4% by weight based on the polymer, and they were mixed with stirring. The resulting mixture was extruded by means of a Co-Kneader with a screw length-to-diameter ratio of 11 (PR 46, a product of Buss Ltd, Switzerland). The extrusion temperature was maintained at 200° C. The formaldehyde generated and the unreacted trioxane and dicyclohexane were collected and recovered from the vent outlet. The stabilized copolymer was extruded from the Co-Kneader and became granulated. The copolymer had an intrinsic viscosity of 1.52 dl/g and a $K_{222}$ value of 0.01 %/min. A molded article produced from the copolymer had the following properties.

Tensile strength — 609 kg/cm$^2$
Tensile elongation — 50%
Flexural strength — 820 kg/cm$^2$
Flexural modulus — 24000 kg/cm$^2$
Izod impact strength (notched, ⅛ inch) — 7.0 kg-cm/cm
Tensile impact strength — 150 kg-cm/cm$^2$
Heat distortion temperature — 108° C

EXAMPLE 10

A kneader equipped with two sigma-blades was charged with trioxane, and heated at 60° C. 2.5% by weight, based on the trioxane, of ethylene oxide and 0.013 mole%, based on the trioxane, of boron trifluoride diethyl etherate were added, and with stirring, the monomers were polymerized for 15 minutes to afford 98% of an oxymethylene copolymer. To the resulting copolymer was added 2 molar times the amount of the catalyst of triphenyl phosphine to deactivate the catalyst. (A part of the crude copolymer was washed well with methanol and water, and dried. The resulting copolymer had an intrinsic viscosity of 1.60 dl/g.)

To 100 parts of the crude copolymer after the addition of triphenyl phosphine were added 0.5 part of bisphenyl urethane of 1,4-butanediol, 0.2 part of malonamide, 0.5 part of 2,2'-methylenebis(4-methyl-6-tert.butyl phenol) and 0.015 part of sodium hydroxide, and they were kneaded under heat in a kneader.

The resulting stabilized copolymer had an intrinsic viscosity of 1.61 dl/g and a $K_{222}$ value of 0.030 %/min.

EXAMPLE 11

Trioxane and 3.5% by weight of 1,3-dioxepane were polymerized in the same way as in Example 10. An oxymethylene copolymer was obtained in a yield of 97.5%. To the resulting copolymer triphenyl phosphine was added in an amount 2 molar times the amount of the catalyst to deactivate the catalyst. (A part of the resulting crude polymer was well washed with methanol and water. The resulting copolymer has an intrinsic viscosity of 1.74 dl/g.

To 100 parts of the crude copolymer after the addition of triphenyl phosphine were added 0.5 part of urea, and 0.5 part of Irganox 1908 (a trademark for a commercially available hindered phenol-type heat stabilizer). The mixture was divided into two portions. To one portion was added 0.5 part, per 100 parts of the copolymer, of calcium hydroxide, and the other portion was caused to remain untreated. Each of these portions was kneaded under heat by a kneader to decompose the unstable portions.

The copolymer to which calcium hydroxide was added had a $K_{222}$ value of 0.030 %/min. and an intrinsic viscosity of 1.73 dl/g. The copolymer without the addition of calcium hydroxide had a $K_{222}$ value of 0.045 %/min. and an intrinsic viscosity of 1.62 dl/g.

EXAMPLE 12

The same kneader as used in Example 10 was charged with trioxane, 10% by weight, based on the trioxane, of cyclohexane and 2.5% by weight, on the same basis, of ethylene oxide, and they were dissolved at 60° C. Boron trifluoride diethyl etherate was added in an amount of 0.017 mole% based on the trioxane, and the monomeric mixture was polymerized to afford an oxymethylene copolymer in a yield of 97%. (The polymer obtained was dispersed in methanol containing amine, then repeatedly washed with methanol and water, and dried. The resulting polymer had an intrinsic viscosity of 1.74 dl/g.

Triphenyl phosphine was added to the copolymer in an amount 2 molar times the amount of the catalyst thereby to neutralize the catalyst. To 100 parts of the copolymer were added 0.3 parts of bisphenyl urethane of 1,4-butanediol, 0.2 part of malonamide, 0.5 part of Irganox 1098 (trademark) and 0.5 part of calcium hydroxide, and they were kneaded at 200° C for 50 minutes in a kneader. The resulting stabilized copolymer had an intrinsic viscosity of 1.75 dl/g and a $K_{222}$ value of 0.006 %/min.

For comparison, the same procedure as above was repeated except that 2 molar times of sodium hydroxide was added instead of 2 molar times of triphenyl phosphine. The resulting stabilized copolymer had an intrinsic viscosity of 1.48 dl/g and a $K_{222}$ value of 0.032 %/min.

EXAMPLE 13

Triphenyl phosphine was added to an oxymethylene copolymer prepared in the same way as in Example 12 and having an intrinsic viscosity of 1.74 dl/g in an amount 2 molar times the amount of the catalyst in the copolymer thereby to neutralize and deactivate the catalyst. To 100 parts of the resulting copolymer were added 0.3 part of bisphenyl urethane of 1,4-butanediol, 0.2 part of malonamide, 0.5 part of Irganox 1098 (trademark) and each of the stabilization aids shown in Table 3 in the amounts indicated, and they were kneaded under heat. The $K_{222}$ values, intrinsic viscosities, and colors of the resulting stabilized copolymers were determined.

For comparison, the above procedure was repeated except that the stabilization aid was not added, or 0.5 part of adipic acid dihydrazide was added instead of the stabilization aid.

The results obtained are given in Table 3.

Table 3

|  | Stabilization aid | Amount of Stabilization aid (wt. %) | $([\eta])$ (dl/g) | $K_{222}$ (%/min.) | Color |
|---|---|---|---|---|---|
| Invention | KOH | 0.01 | 1.73 | 0.022 | white |
|  | Mg(OH)$_2$ | 0.5 | 1.74 | 0.032 | white |
|  | Na$_2$CO$_3$ | 0.1 | 1.72 | 0.010 | white |
|  | Na$_2$SiO$_3$ | 0.3 | 1.70 | 0.026 | white |
|  | Na$_2$HPO$_3$ | 0.5 | 1.67 | 0.025 | white |
|  | None | — | 1.50 | 0.068 | pale brown |
| Comparison | Adipic acid hydrazide | 0.5 | 1.72 | 0.048 | brown |

EXAMPLE 14

In the same way as in Example 10, an oxymethylene copolymer was prepared. Triphenyl phosphine was added to the resulting copolymer in an amount 2 molar times the amount of the catalyst in the copolymer thereby to deactivate the catalyst. (A part of the crude copolymer was washed with methanol and water, and dried. The resulting copolymer had an intrinsic viscosity of 1.60 dl/g.)

To 100 parts of the crude copolymer after the addition of triphenyl phosphine were added 0.5 part of bisphenyl urethane of 1,4-butanediol, 0.2 part of malonamide, 0.5 part of 2,2'-methylenebis(4-methyl-6-tert.butyl phenol) and 0.5 part of sodium oxydiacetate (NaOOCCH$_2$CH$_2$—O—CH$_2$CH$_2$COONa), and they were kneaded under heat by a kneader. The resulting stabilized copolymer had an intrinsic viscosity of 1.59 dl/g and a $K_{222}$ value of 0.030 %/min.

EXAMPLE 15

100 parts of an oxymethylene copolymer having an intrinsic viscosity of 1.60 dl/g which was obtained in Example 10 by deactivating the catalyst with triphenyl phosphine was kneaded at an elevated temperature under the same conditions as in Example 10 except that 0.5 part of sodium ethyl alcoholate was added instead of 0.015 part of sodium hydroxide. The stabilized copolymer obtained had an intrinsic viscosity of 1.60 dl/g and a $K_{222}$ value of 0.015 %/min.

EXAMPLE 16

Trioxane was charged with a kneader equipped with two sigma-blades, and melted by heating to 60° C. Then, 2.5% by weight, based on the trioxane, of ethylene oxide and 0.018 mole%, on the same basis, of boron trifluoride diethyl etherate were added, and with stirring, the monomers were polymerized for 15 minutes. An oxymethylene copolymer was obtained in a yield of 98%.

A part of the crude polymer obtained was washed with methanol containing tributylamine, then repeatedly washed with methanol and water, and dried. The stabilizers shown in Table 4 were added, and the entire mixture was kneaded under heat by a laboplast mill.

To the remainder of the crude polymer were added each of the organic phosphorus compounds shown in Table 4 in an amount 2 molar times the amount of the catalyst and each of the stabilizers shown in Table 4 in the amounts indicated in weight percent based on the copolymer. The entire mixture was kneaded under heat. The run in which sodium hydroxide was used was carried out for comparison.

The intrinsic viscosities and $K_{222}$ value of the stabilized copolymers were determined, and the results are tabulated below.

Table 4

| Deactivator | Washing with solvent | Heat stabilizer (wt.%) | Antioxidant (wt.%) | Stabilization aid | $K_{222}$ (%/min.) | $([\eta])$ (dl/g) |
|---|---|---|---|---|---|---|
| Tributylamine | Yes | Cyanoguanidine (0.5) | Antage W400* (0.5) | None | 0.012 | 1.21 |
| Triphenyl phosphine | No | " | " | None | 0.020 | 1.20 |
| Tridecyl phosphite | No | " | " | None | 0.025 | 1.19 |
| Triphenyl phosphine | No | Bisphenyl urethane of 1,4-butanediol (0.2) Malonamide (0.2) | Irganox 1098 (0.5) | Ca(OH)$_2$ (0.5) | 0.010 | 1.22 |
| Ethyl diphenyl phosphinite | No | " | " | " | 0.015 | 1.20 |
| Diphenyl ethylphosphonite | No | 41 | " | " | 0.018 | 1.19 |
| Triphenyl phosphite | No | " | " | " | 0.019 | 1.19 |
| Sodium hydroxide | No | " | " | " | 0.035 | 1.10 |

*2,2-methylenebis(4-methyl-6-tert.butyl phenol, a product of Kawaguchi Chemical Industry Ltd. Japan

EXAMPLE 17

Trioxane and 3.5% by weight, based on the trioxane, of 1,3-dioxepane were copolymerized in the same way as in Example 16. Triphenyl phosphine was added to the resulting copolymer in an amount 2 molar times the amount of the catalyst to deactivate the catalyst. A part of the crude copolymer was washed thoroughly with methanol and water, and dried to afford a copolymer having an intrinsic visosity of 1.74 dl/g.

To 100 parts of the remainder of the crude copolymer were added 0.3 part of bisphenyl urethane of 1,4-butanediol, 0.2 part of malonamide, 0.5 part of Irganox 1098 and each of the stabilization aids shown in Table 5 in the amount indicated. The entire mixture was kneader under heat by a laboplast mill. The intrinsic viscosities, $K_{222}$ values and colors of the resulting stabilized copolymers were determined, and the results are shown in Table 5.

Table 5

| Stabilization aid | | | | |
| --- | --- | --- | --- | --- |
| Type | Amount (wt.%) | [η] (dl/g) | $K_{222}$ %min.) | Color |
| None | — | 1.50 | 0.068 | pale brown |
| KOH | 0.01 | 1.73 | 0.02 | white |
| Mg(OH)$_2$ | 0.5 | 1.74 | 0.032 | white |
| Na$_2$CO$_3$ | 0.1 | 1.72 | 0.010 | white |
| Na$_2$SiO$_3$ | 0.5 | 1.70 | 0.026 | white |
| Na$_2$HPO$_4$ | 0.5 | 1.69 | 0.025 | white |
| Sodium ethoxide | 0.5 | 1.72 | 0.015 | pale yellow |
| Sodium oxydiacetate | 0.5 | 1.65 | 0.032 | white |

EXAMPLE 18

Trioxane and 2.5% by weight, based on the trioxane, of ethylene oxide were polymerized in the same way as in Example 16. Triphenyl phosphine was added to the copolymer in an amount 2 molar times the amount of the catalyst thereby to deactivate the catalyst. A part of the crude copolymer obtained was thoroughly washed with methanol and water, and dried to afford a copolymer having an intrinsic viscosity of 1.30 dl/g.

To the remainder of the crude copolymer were added the stabilizers shown in Table 6 in the amounts indicated (% by weight based on the copolymer). The entire mixture was kneaded under heat by a laboplast mill. The $K_{222}$ values, intrinsic viscosities and colors of the resulting stabilized copolymers were determined, and the results are shown Table 6.

Table 6

| Heat Stabilizer (% by weight) | Antioxidant (% by weight) | Stabilization aid (% by weight) | [η] (d/g) | $K_{222}$ (%/min.) |
| --- | --- | --- | --- | --- |
| Nylon-11 copolymer (1.0) | Antage W400 (0.5) | Ca(OH)$_2$ (0.1) | 1.32 | 0.017 |
| Nylon-12 copolymer (1.0) | " | " (0.1) | 1.31 | 0.017 |
| 1,3-Dimethylurea (0.5) | Irganox 259 (0.5) | " (0.1) | 1.29 | 0.030 |
| Polyvinyl pyrrolidone (0.5) | Antage W400 (0.5) | " (0.1) | 1.32 | 0.017 |
| Cyanoguanidine (0.5) | " (0.5) | None | 1.30 | 0.015 |
| Bisphenyl urethane of 1,4-butanediol (0.3) and malonamide (0.2) | Irganox 1098 (0.5) | Ca(OH)$_2$ (0.5) | 1.32 | 0.010 |
| " | Irganox 1098 (0.5) | Ammonia (0.05) | 1.29 | 0.016 |

Note:
Nylon-11 copolymer:FT Natural, a product of Rilsan Corp.
Nylon-12 copolymer:N1901, a product of Chemische Werk Huels AG.
Antage W400:2,2'-methylenebis(4-methyl-6-tert. butyl phenol), a product of Kawaguchi Chemical Industry Ltd.

EXAMPLE 19

A Henschel-type high speed stirring reactor was charged with 5 kg of trioxane, 0.5 kg of cyclohexane and 0.13 kg ethylene oxide, and they were dissolved at 60° C. Then, 0.018 mole%, based on the trioxane, of boron trifluoride diethyl etherate was added as a benzene solution, and the monomeric mitrue was polymerized for 30 minutes. Triphenyl phosphine in an amount 2 molar times the amount of the catalyst, 0.2% by weight, based on the polymer, of a nylon 11 copolymer, 0.5% by weight, on the same basis, of Irganox 259 and 0.1%, on the same basis, of calcium hydroxide were added, and the materials were mixed with stirring.

The mixture was fed into a biaxial extruder (ZDS-RE type, a product of Werner & Pfeiderer Company), and heated at 200° C to stabilize it. The residence time in the extruder was 15 minutes. The formaldehyde generated, and the unreacted trioxane and cyclohexane were collected and recovered from a vent outlet.

The stabilized copolymer was extruded from a die and became granules. The copolymer had an intrinsic viscosity of 1.45 dl/g and a $K_{222}$ value of 0.01 %/min. A molded article prepared from the copolymer had the following properties.

Tensile strength — 609 kg/cm$^2$
Tensile elongation — 60%
Flexural strength — 820 kg/cm$^2$
Flexural modulus — 22600 kg/cm$^2$
Izod impact strength (notched; ⅛ inch) — 7.0 kg-cm/cm
Tensile impact strength — 140 kg-cm/cm$^2$
Heat distortion temperature — 110° C.

What we claim is:

1. In a process for preparing oxymethylene polymers which comprises polymerizing trioxane or both trioxane and a cyclic ether of the following formula

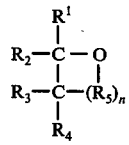

wherein $R_1$, $R_2$, $R_3$ and $R_4$, identical or different, represent a hydrogen atom, an alkyl group containing 1 to 5 carbon atoms, or an alkyl group containing 1 to 5 carbon atoms and substituted by 1 to 3 halogen atoms; and $R_5$ represents a methylene group, a methylene group substituted by an alkyl group, a methylene group substituted by a haloalkyl group, an oxymethylene group, an oxymethylene group substituted by an alkyl group or an oxymethylene group substituted by a haloalkyl group, in which case $n$ is 0 or an integer of 1 to 3, the substituent alkyl group is an alkyl group containing 1 to 5 carbon atoms and the substituent haloalkyl group is an alkyl group containing 1 to 5 carbon atoms and substituted by 1 to 3 halogen atoms, or $R_5$ alternatively represents —$(CH_2)_m$—$OCH_2$—, or —$(OCH_2$—$CH_2)_m$—$OCH_2$— in which $m$ is an integer of 1 to 3, in which case $n$ is 1, in the presence of a catalytic amount of a boron fluoride-type catalyst, stopping the polymerization, and then subjecting the resulting polymer to a terminal stabilizing treatment, the improvement which comprises stopping the polymerization by adding a trivalent organic phosphorous compound of the following formula

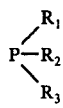

wherein each of $R_1$, $R_2$ and $R_3$ represents an alkyl, haloalkyl, aryl, substituted aryl, alkoxy, substituted alkoxy, aryloxy, substituted aryloxy, alkylthio, substituted alkylthio, arylthio or substituted arylthio group, and then performing the terminal stabilizing treatment without removing the catalyst from the polymer by washing.

2. The process of claim 1 wherein said catalyst is at least one compound selected from the group consisting of boron trifluoride, boron trifluoride hydrate, and coordinated complex compounds formed between boron trifluoride and organic compounds containing an oxygen or sulfur atom.

3. The process of claim 1 wherein the amount of the organic phosphorus compound is at least equimolar to the amount of the catalyst.

4. The process of claim 1 wherein substantially only trioxane is polymerized, and its terminal groups are stabilized by acetylation.

5. The process of claim 1 wherein trioxane and the cyclic ether are copolymerized, and the terminal groups of the resulting copolymer are stabilized by heating it to a temperature ranging from a point 50° C lower than the melting point of the copolymer to a point 50° C higher than it in the presence of a stabilizer.

6. The process of claim 5 wherein the amount of the stabilizer is 0.1 to 5% by weight based on the copolymer.

7. The process of claim 5 wherein the heating is carried out in the presence of said stabilizer and at least one stabilization aid which is at least one compound selected from the group consisting of hydroxides of alkali metals, hydroxides of alkaline earth metals, weak inorganic acid salts of alkali metals, weak inorganic acid salts of alkaline earth metals, organic acid salts of alkali metals, organic acid salts of alkaline earth metals, alkoxides of alkali metals and alkoxides of alkaline earth metals.

8. The process of claim 7 wherein the amount of the stabilization aid is 0.001 to 10% by weight based on the copolymer.

* * * * *